(12) United States Patent
Bourdev et al.

(10) Patent No.: US 7,256,798 B2
(45) Date of Patent: Aug. 14, 2007

(54) PROCESSING COMPLEX REGIONS OF ILLUSTRATION ARTWORK

(75) Inventors: Lubomir D. Bourdev, Santa Clara, CA (US); Stephen N. Schiller, Hayward, CA (US)

(73) Assignee: Adobe Systems Incorporated, San Jose, CA (US)

( * ) Notice: Subject to any disclaimer, the term of this patent is extended or adjusted under 35 U.S.C. 154(b) by 36 days.

(21) Appl. No.: 11/029,822

(22) Filed: Jan. 4, 2005

(65) Prior Publication Data

US 2005/0116963 A1 Jun. 2, 2005

Related U.S. Application Data

(63) Continuation of application No. 09/447,024, filed on Nov. 22, 1999, now Pat. No. 6,894,704.

(51) Int. Cl.
*G09G 5/00* (2006.01)
(52) U.S. Cl. ............. 345/619; 345/629; 345/630; 345/634; 345/552; 345/641; 345/582; 345/592
(58) Field of Classification Search ........... 345/420, 345/629, 630, 634, 552, 641, 582, 583, 592, 345/426
See application file for complete search history.

(56) References Cited

U.S. PATENT DOCUMENTS

| | | | |
|---|---|---|---|
| 4,769,636 A | 9/1988 | Iwami et al. | |
| 5,153,937 A | 10/1992 | Wobermin et al. | |
| 5,337,404 A | 8/1994 | Baudelaire et al. | |
| 5,390,291 A | 2/1995 | Ohashi | |
| 5,509,110 A | 4/1996 | Latham | |
| 5,534,915 A | 7/1996 | Sandrew | |
| 5,555,352 A | 9/1996 | Lucas | |
| 5,589,851 A | 12/1996 | Valdes et al. | |
| 5,600,763 A | 2/1997 | Greene et al. | |
| 5,649,083 A | 7/1997 | Barkans et al. | |
| 5,680,526 A | 10/1997 | Andersen et al. | |
| 5,687,304 A | 11/1997 | Kiss | |
| 5,745,121 A | 4/1998 | Politis | |
| 5,818,962 A | 10/1998 | Mizukami | |
| 5,818,975 A | 10/1998 | Goodwin et al. | |
| 5,841,443 A | 11/1998 | Einkauf | |
| 5,889,527 A | 3/1999 | Tsai | |

(Continued)

FOREIGN PATENT DOCUMENTS

| | | |
|---|---|---|
| EP | 0528631 | 2/1993 |
| EP | 0712089 | 5/1996 |
| EP | 0924653 | 6/1999 |
| EP | 1104918 | 5/2005 |
| JP | 2001-188915 | 7/2001 |

OTHER PUBLICATIONS

Heckbert (ed.), Graphics Gems IV, 1994, AP Professional, Academic Press, Inc., Cambridge, MA, pp. 29-30.

(Continued)

*Primary Examiner*—Kimbinh T. Nguyen
(74) *Attorney, Agent, or Firm*—Fish & Richardson P.C.

(57) ABSTRACT

A computer-based method of processing a computer graphics illustration having pieces of artwork includes mapping outlines of the pieces of artwork onto a grid of cells, determining a number of outlines that map to a cell, and identifying a complex region based on the determined number of outlines that map to the cell.

19 Claims, 13 Drawing Sheets

U.S. PATENT DOCUMENTS

| | | | |
|---|---|---|---|
| 5,912,672 | A | 6/1999 | Liguori |
| 5,912,674 | A | 6/1999 | Magarshak |
| 5,923,333 | A | 7/1999 | Stroyan |
| 5,926,185 | A | 7/1999 | Vyncke et al. |
| 5,936,634 | A | 8/1999 | Kawamoto et al. |
| 5,977,979 | A | 11/1999 | Clough et al. |
| 5,991,461 | A | 11/1999 | Schmucker et al. |
| 6,011,595 | A | 1/2000 | Henderson et al. |
| 6,020,897 | A | 2/2000 | Carlsen et al. |
| 6,031,544 | A | 2/2000 | Yhann |
| 6,043,824 | A | 3/2000 | Bier |
| 6,049,339 | A | 4/2000 | Schiller et al. |
| 6,072,501 | A | 6/2000 | Bier |
| 6,198,489 | B1 | 3/2001 | Salesin et al. |
| 6,289,364 | B1 | 9/2001 | Borg et al. |
| 6,298,172 | B1 | 10/2001 | Arney et al. |
| 6,356,274 | B1 | 3/2002 | Spector |
| 6,359,635 | B1 | 3/2002 | Perttunen |
| 6,389,161 | B1 | 5/2002 | Krabbenhoft |
| 6,437,796 | B2 | 8/2002 | Sowizral et al. |
| 6,515,675 | B1 | 2/2003 | Bourdev |
| 6,553,139 | B1 | 4/2003 | Kaup |
| 6,651,121 | B1 | 11/2003 | Zurawski et al. |
| 6,720,977 | B1 | 4/2004 | Bourdev et al. |
| 6,757,888 | B1 | 6/2004 | Knutson et al. |
| 6,850,956 | B1 | 2/2005 | Knutson |
| 6,859,553 | B1 | 2/2005 | Bourdev et al. |
| 6,868,193 | B1 | 3/2005 | Gharbia et al. |
| 6,894,704 | B1 | 5/2005 | Bourdev et al. |
| 2004/0001227 | A1 | 1/2004 | Bourdev |

OTHER PUBLICATIONS

Adobe Creative Team, Adobe Illustrator 9.0 Classroom in a Book, Adobe Press, Oct. 5, 2000, pp. 1-14 (as printed from the web).

Baudelaire, et al., "Planar Maps: An Interaction Paradigm for Graphic Design", *SIGCHI Bulletin*, New York, NY, USA, pp. 313-318, May 1989.

Heckbert (ed.), *Graphics Gems IV*, 1994, AP Professional, Academic Press, Inc., Cambridge, MA, pp. 29-30.

PROCESSING COMPLEX REGIONS OF ILLUSTRATION ARTWORK

CROSS-REFERENCE TO RELATED APPLICATIONS

This application is a continuation application and claims the benefit of priority under 35 U.S.C. Section 120 of U.S. application Ser. No. 09/447,024, filed Nov. 22, 1999; now U.S. Pat. No. 6,894,704. The disclosure of the prior application is considered part of and is incorporated by reference in the disclosure of this application.

BACKGROUND OF THE INVENTION

This invention relates to processing pieces of artwork in a computer-graphics illustration.

Many items in everyday life exhibit some degree of transparency. For example, a car windshield is almost completely transparent. The tinted glass of a bottle is less transparent than a car windshield; however, a viewer can still make out objects behind the bottle.

Simulating transparency in a computer-generated images can consume large amounts of computer memory due to the amount of data needed to describe the image. For example, an image printed by a typical computer printer is made up of millions of colored dots roughly 0.005 inches in size. For each dot, a computer must determine a color based on the different transparent graphics overlapping the area covered by the dot. The process of determining these colors is known as "compositing."

SUMMARY OF THE INVENTION

In general, in one aspect, the invention features a computer-based method of processing a computer graphics illustration having pieces of artwork. The method includes mapping outlines of at least some of the pieces of artwork onto a grid of cells, determining a number of outlines that map to a cell of the grid, and identifying a complex region based on the determined number of outlines that map to the cell.

Embodiments may include one or more of the following features. The method may include identifying artwork pieces to include in an illustration flattening process (e.g., producing a planar map) based on the identification of the complex region. Artwork classified as entirely inside the complex region may be excluded from the flattening. The mapping may include drawing the outlines using a rasterization engine function. Identifying complex regions may include comparing the determined number of artwork pieces that enter a cell with a threshold (e.g., a user defined or dynamically determined threshold). The illustration may have a first associated resolution and the grid may have a second resolution being less than the first resolution.

The method may further include classifying artwork based on the intersection of the artwork with the complex regions. For example, artwork may be classified as being completely inside a complex region, completely outside a complex region, or partially inside a complex region.

In general, in another aspect, a computer program product, disposed on a computer readable medium, for processing a computer graphics illustration having pieces of artwork includes instructions for causing a processor to map outlines of pieces of artwork onto a grid of cells, determine a number of outlines that map to a cell of the grid, identify a complex region based on the determined number of outlines that map to the cell, and based on the identifying, excluding pieces of artwork from an illustration flattening process.

Advantages of the invention will become apparent in view of the following description, including the figures, and the claims.

DETAILED DESCRIPTION

I. Introduction

Figure 1:
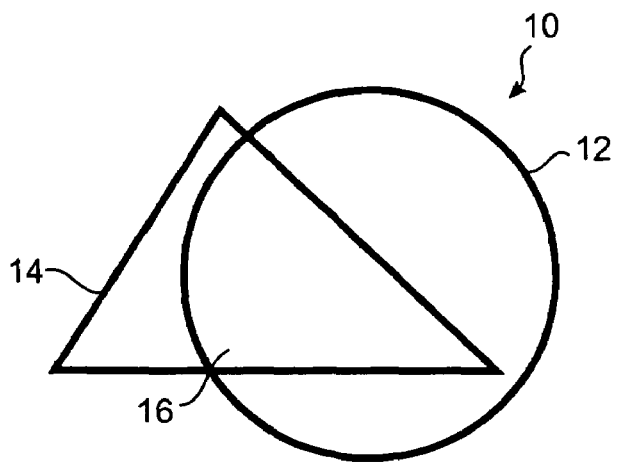
FIGS. 1–4 are diagrams of illustrations that include overlapping artwork objects.

FIG. 1 shows a computer illustration 10 that includes a circle 12 and a triangle 14. The circle 12 and triangle 14 are simple examples of artwork objects. An artwork object 12, 14 includes an outline shape (i.e., a path) and an appearance. The appearance may include a particular color, a type of shading, and/or a picture (i.e., a raster).

Figure 2:
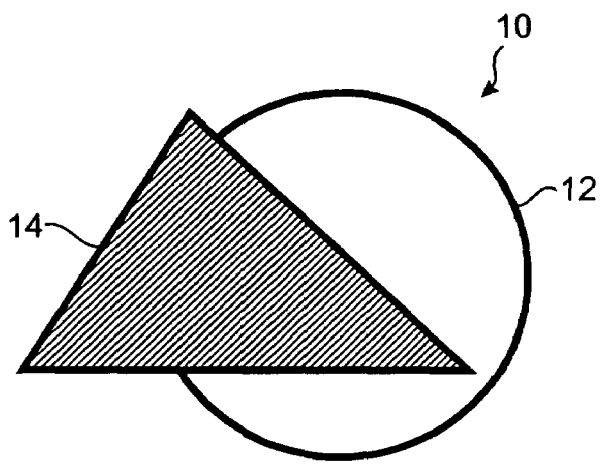

As shown in FIG. 1, the intersection of circle 12 and triangle 14 forms a region 16. This intersection raises an important question. Should region 16 appear like the circle 12, the triangle 14, or some mixture of the two? One way to resolve the question of how to display regions shared by objects is to define different illustration layers. Each object appears on at least one layer. Objects at higher layers can block the visibility of objects at lower layers. These layers can be established by defining a painting order that describes a sequence for placing artwork objects in the illustration 10 (e.g., first paint the circle, then paint the triangle on top of the circle). Each object in the painting order essentially is given its own layer with objects earlier in the painting order appearing behind objects later in the order. As shown in FIG. 2, an opaque artwork object 14 on a higher layer can hide portions of an artwork object 12 on a lower layer.

Figure 3:
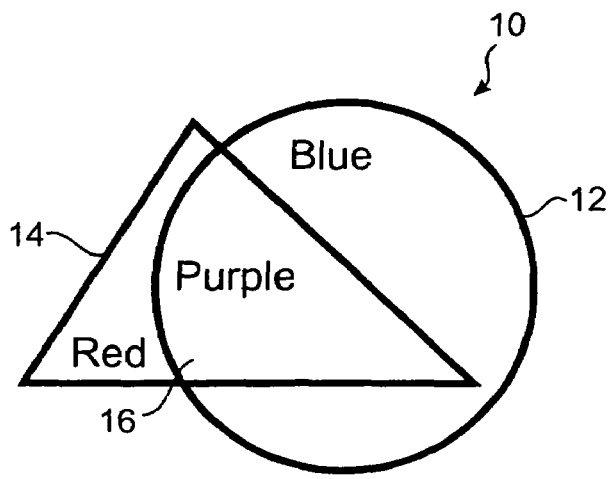

Instead of completely covering another object, artwork objects can exhibit some transparency. As shown in FIG. 3, when red triangle 14 has some degree of transparency, placing red triangle 14 on top of blue circle 12 produces a mixture of red and blue (e.g., purple) where triangle 14 overlaps circle 12. The more transparent the triangle 14, the more the appearance of the circle 12 dominates the appearance of the shared region 16. In this case, increased transparency of the triangle 14 produces a bluer intersection region 16. Similarly, decreased transparency of triangle 14 produces a redder intersection region 16.

Figure 4:
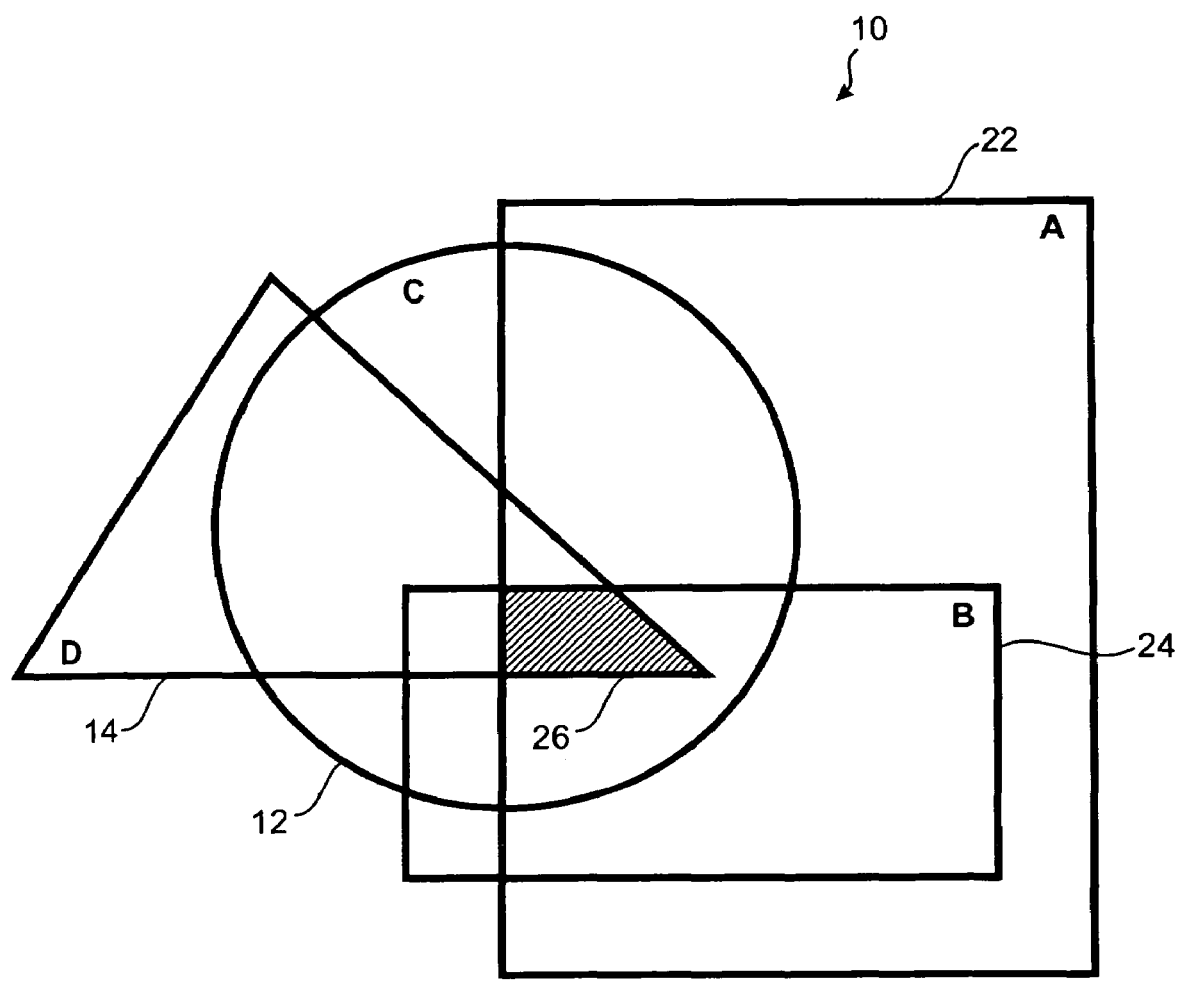

As shown in FIG. 4, adding additional artwork objects 22, 24 can quickly complicate an illustration 10. For example, adding just two rectangles 22, 24 increased the number of intersection regions between objects from one to twelve. Each additional intersection represents an additional region that the software must process.

Figure 5:
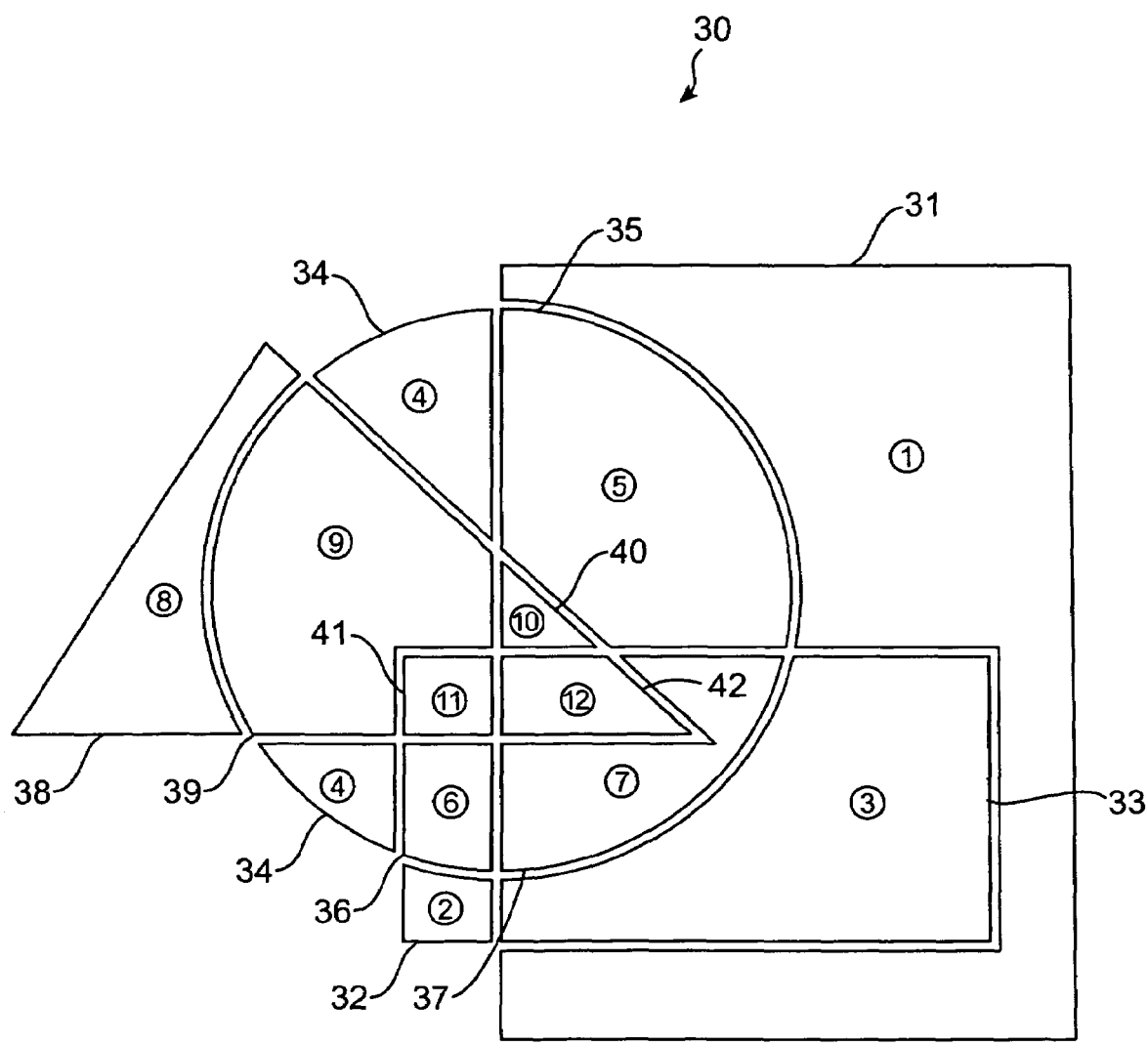
FIG. 5 is a diagram of a planar map.

FIG. 5 shows a planar map 30 produced by flattening the multiple layers in an illustration (e.g., illustration 10 in FIG. 4) into an equivalent single layer of opaque regions. FIG. 5 shows exaggerated seams between the regions 31–42 for illustrative purposes. Much like a stained-glass window, a planar map 30 features interlocking non-overlapping regions 31–42. The appearance (e.g., a color, gradient, or raster) of each opaque region is determined such that outputting (e.g., sending to a printer or another program) the planar map regions is essentially indistinguishable from outputting the illustration objects directly. That is, instead of outputting each artwork object (e.g., circle 12, triangle 14, and rectangles 22 and 24 in FIG. 4), a system can output the path and appearance of each region 31–42 in the planar map.

The non-overlapping regions of the planar map are known as "atomic regions." Atomic regions are opaque illustration regions that are not intersected by other regions. The appearance of any atomic region is based on the appearances of the artwork objects covering the region in the original illustration (FIG. 4).

Different techniques for constructing and using the planar map can conserve memory when compositing an displaying an illustration.

II. Postponed Compositing

Figure 6:
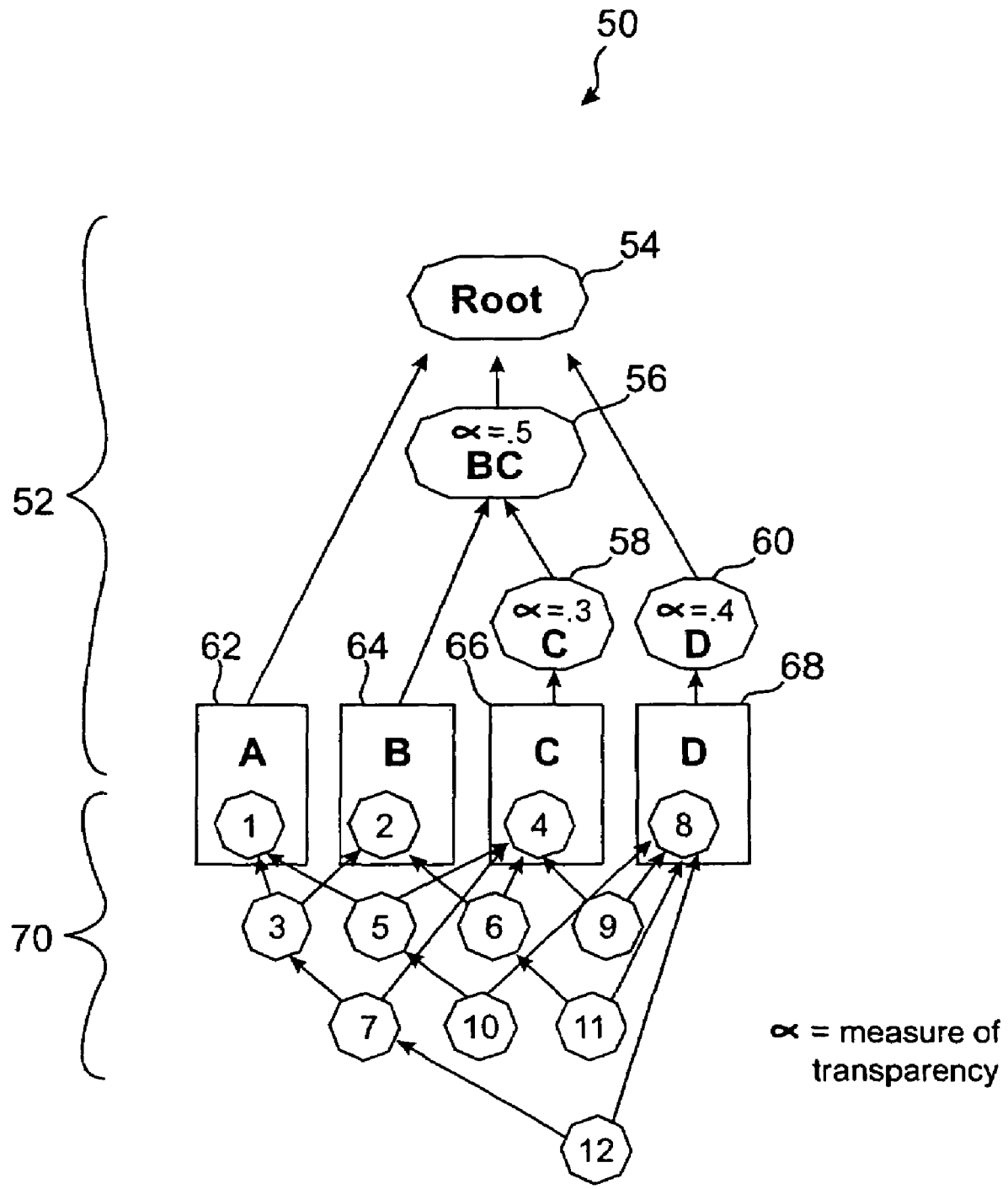
FIG. 6 is a diagram of a graph that can be used to determine the appearance of regions in the planar map.

FIG. 6 shows information that can be used to determining the appearance of different illustration regions. As shown, the information is in the form of a graph 50. The graph 50 includes a bottom portion 70 that features nodes, labelled "1" through "12", for each planar map region. Each node is the root of a binary tree that terminates in one or more leaves 62–68 corresponding to the illustration artwork objects. For example, node "3" (corresponding to atomic region "3" 33 in the planar map of FIG. 5) is the root of a binary tree that includes pointers to children nodes "1" and "2". Nodes "1" and "2" in turn include pointers to artwork objects A 62 and B 64 (the rectangles in FIG. 4).

Traversing the tree rooted by any node can be used to quickly determine the appearance of the node's planar map region. For example, node "1" represents the appearance of artwork object A 62; node "2" represents the appearance of artwork object B 64; and node "3" represents the composite appearance of artwork object B layered over artwork object A. Thus, the tree 70 acts as a pre-calculated set of indices that can be used dynamically to determine any represented region's appearance.

The appearance for each node can be pre-determined and stored for use as needed. Though this may be practical in the relatively simple illustration shown, the amount of memory needed for storage can swell as the illustration incorporates more artwork objects and the number of regions in the planar map grows.

Alternatively, the tree 70 can be used to determine the appearance of each region dynamically. For example, a system may produce an output stream that includes the path and appearance of each planar map region by making an on-the-fly determination of the region's appearance based on the region's tree 70 node. To conserve memory, the system may discard each determined appearance after the appearance is sent into the output stream. Thus, to output the image of FIG. 5, the system can determine, output, and discard the appearance of node "1"; determine, output, and discard the appearance of node "2"; then re-determine the appearance of nodes "1" and "2" to determine the appearance of node "3"; and so on. At first blush, it may seem inefficient to discard the appearance of nodes "1" and "2" when their appearance will be needed to determine the appearance of node "3". However, discarding (e.g., deallocating from memory, marking for deletion if memory is needed, or otherwise making the memory available for use) each node's appearance after use can reduce the memory consumed when producing an output stream by an order of magnitude.

Preservation of certain determined node appearances (e.g., node "4" which takes part in seven out of the twelve appearance determinations) may speed display of an illustration without greatly increasing memory consumption. For example, nodes involved in the most number of determinations can be identified and these appearances can be preserved for future use instead of being discarded.

The top portion of FIG. 6 includes an artwork tree 52 representing the transparencies of artwork objects. The top portion can be quickly consulted to determine artwork transparency when determining region appearances. The tree 52 includes a root node 54 and nodes 56–60 that specify transparency. The degree of transparency can be represented as a number such as an alpha value that ranges between 0 and 1. A transparency value of "1" represents a completely opaque object. A transparency value of "0" represents a completely transparent object. A node can describe the transparency of an individual object. For example, node 60 indicates that triangle D (14 in FIG. 4) has a transparency value of 0.4.

A node can also describe the transparency of a group of objects. For example, node 56 indicates that the group of circle C (12 in FIG. 4) and rectangle B (24 in FIG. 4) share a transparency value of 0.5. The group transparency value indicates the transparency of the group of objects as a collection, not the transparency of a particular object in the group. That is, the group of circle C and rectangle B will present the same transparent appearance relative to objects behind them, but the transparency of circle C relative to rectangle B is not affected by the group value.

Members of a group (i.e., the nodes for individual objects or other groups) can have their own transparency values that are applied in addition to the transparency value of the group node. For example, node 58 indicates that the circle C will have an additional transparency of 0.3 applied in addition to the transparency of 0.5 indicated by group node 48. Navigating up the tree from an artwork object node 62–68 to the root 54 can quickly produce transparency for any given artwork object.

As shown, transparency is represented by a single value. However, the transparency of an object need not be uniform. For example, an object may have a gradient of transparency. That is, one end of the object may be nearly opaque while another end is nearly completely transparent. In some embodiments, each node includes a reference to a transparency server that handles the different types and degrees of transparency.

Figure 7:
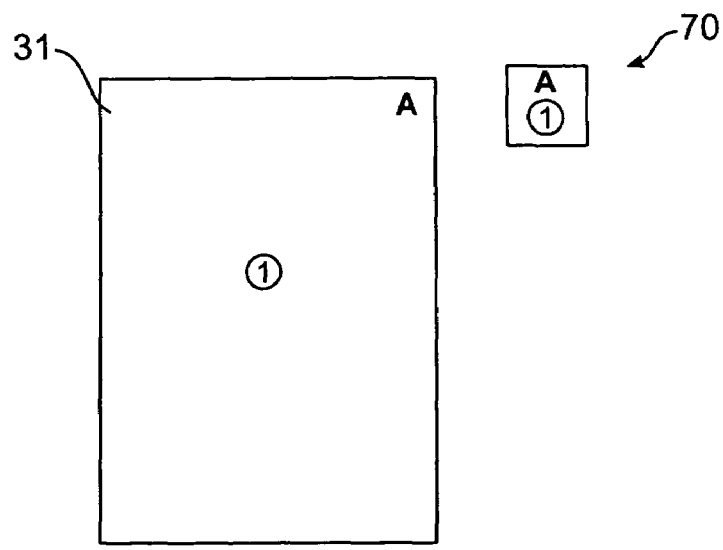
FIGS. 7–9 are diagrams illustrating a process for constructing a planar map and graph.
Figure 8:
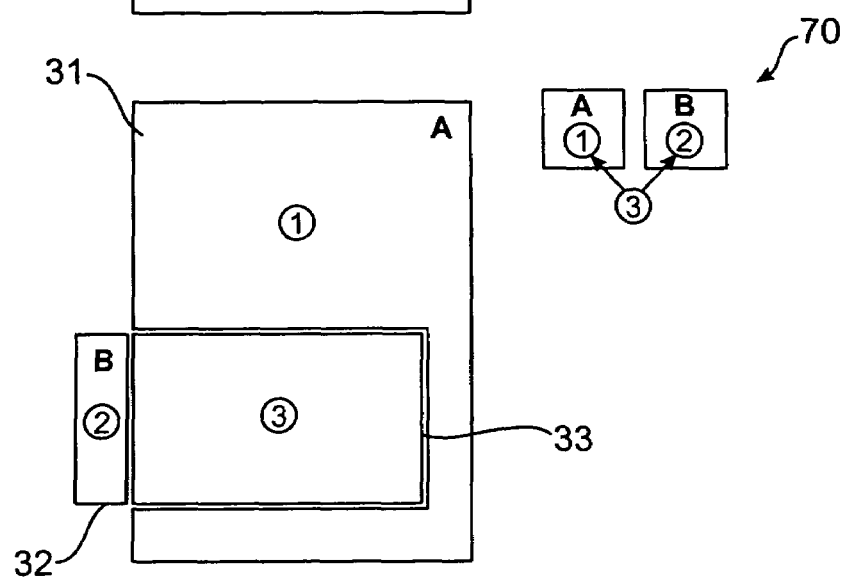
Figure 9:
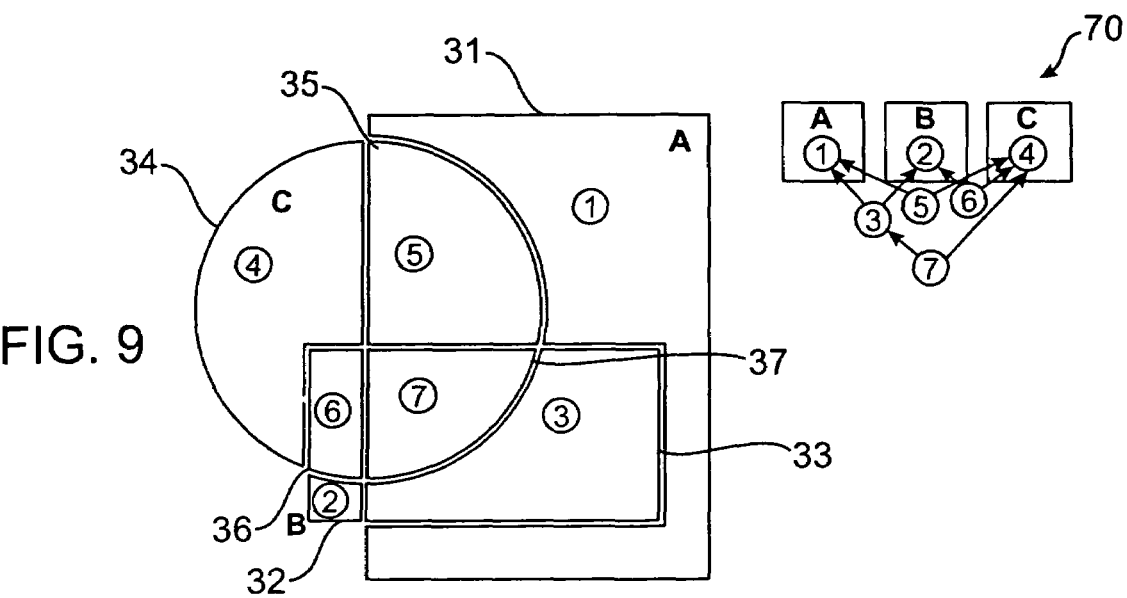

FIGS. 7–9 show one technique for constructing a planar map and graph 70 from a set of illustration artwork objects. FIG. 7 shows the first artwork object 31 in a paint order. The artwork object is added to the planar map along with a node (e.g., node "1") representing the appearance of the region covered by the artwork object. In FIG. 8, the second artwork object, rectangle B 33, adds a new region 32 and carves a region "3" out of previously existing region "1". The second artwork object is added to the planar map graph 70 along with a node for the region belonging solely to rectangle B 32 and a node "3" for the region 33 representing the layering of rectangle B over rectangle A. In FIG. 9, the third artwork object "steals" portions of regions "1", "2", and "3" to produce portions "5", "6", and "7". The new regions are added to the planar map graph in addition to region "4" and a leaf for artwork object C. The process shown in FIGS. 7 to 9 continues until the planar map represents all artwork objects in the paint order. Generating a planar map and graph prior to a request for display of the illustration shifts resource consumption to a time when resources may be in less demand. That is, much of the work involved in outputting an illustration can be done before a printing request. This increases the responsiveness of a system when a printing request is finally received.

Figure 10:
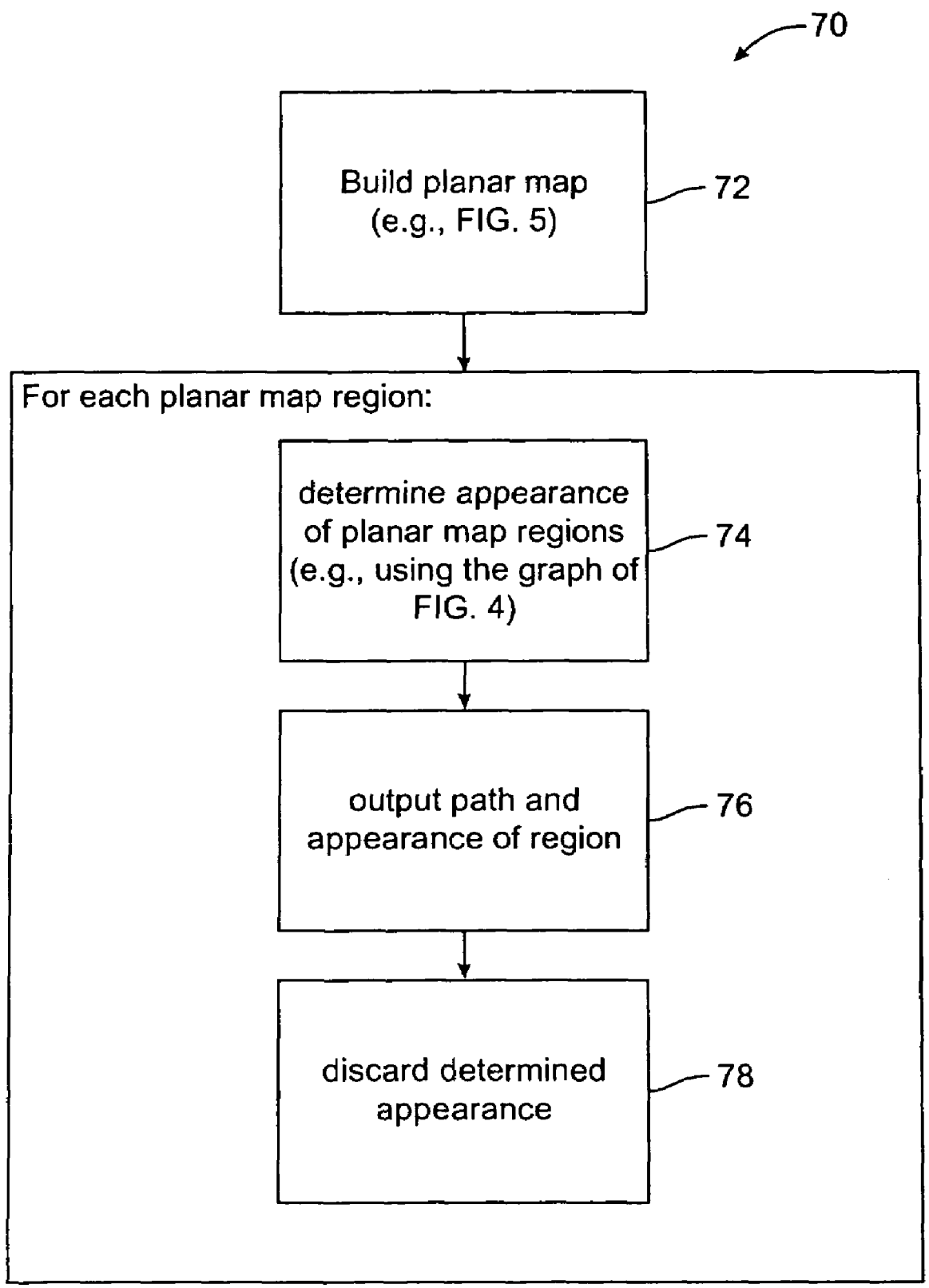
FIG. 10 is a flowchart of a process for outputting an illustration.

After constructing the planar map (FIG. 5) and graph (FIG. 6), the graph can be used to postpone determination of the appearance of a planar map regions until the appearance is to be included in an output stream. In a process 70 shown in FIG. 10, after producing a planar map 72, the process 70 handles each region in the planar map in turn. For each region, the process 70 determines the region's appearance 74 and sends 76 the determined appearance in an output stream along with the path of the region. The output stream may feed into memory of a printer. The process 70 then frees 78 memory used to describe the appearance of the region and begins processing the next region. This continues until each planar map region has been processed.

III. Enhancements

A planar map can become very large for complex illustrations. A number of different techniques can reduce the size of the planar map. Some of these techniques can take advantage of functions provided by existing rasterization engines often present in illustration software such as Adobe® Illustrator®. Further, these techniques may be used in a wide variety of flattening schemes such as schemes that individually determine the appearance of each dot in an illustration.

A. Identifying Opaque Objects

One approach to simplifying the planar map involves identifying opaque objects that do not overlap areas covered by transparent objects. Intuitively, the appearance of such regions is that of the opaque object. Thus, the opaque object can be sent immediately to the output stream and without being added to the planar map.

Figure 11:
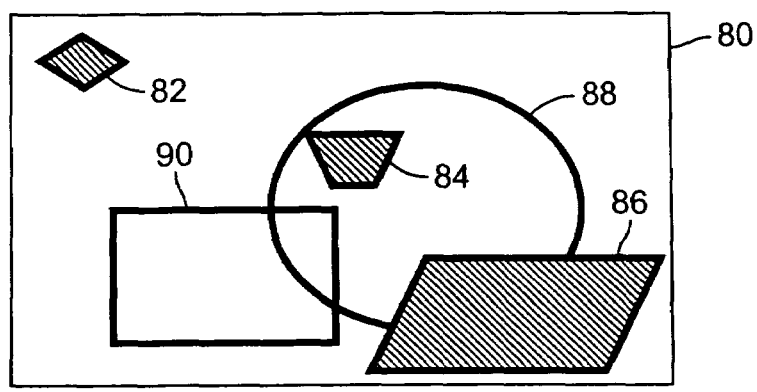
FIGS. 11–14 are diagrams illustrating a process for identifying transparent regions of an illustration.

FIG. 11 shows an illustration 80 that includes different opaque (shown as shaded) 82, 84, 86 and transparent 88, 90 artwork objects. A wide variety of techniques can be used to identify those opaque objects (or portions of opaque objects) that do not overlap any transparent objects. For example, a process could test each opaque object against each transparent object to determine whether their paths intersect. The number of comparisons, however, increases geometrically with each additional artwork object.

Figure 12:
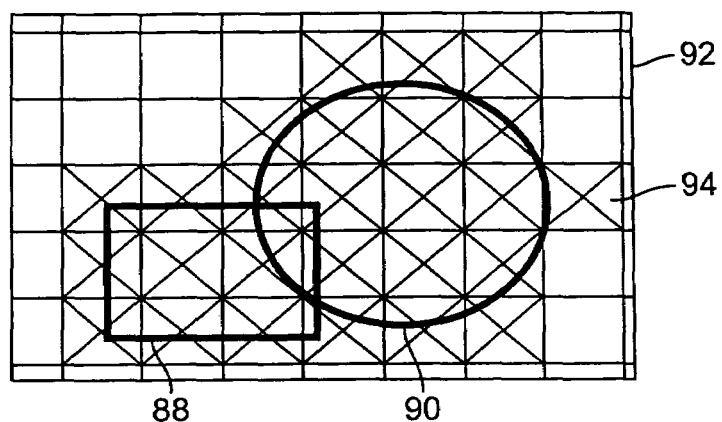
Figure 13:
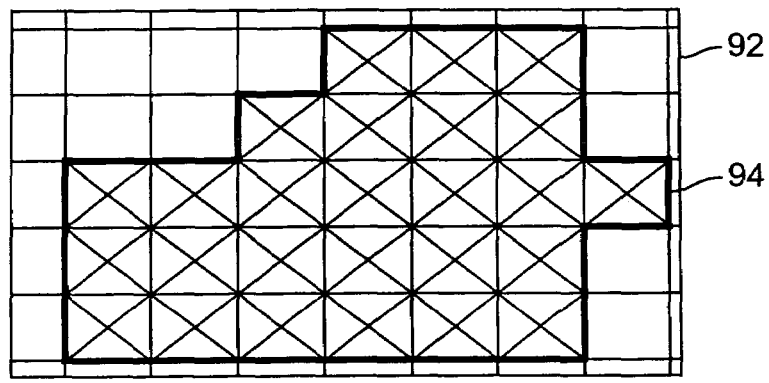
Figure 14:
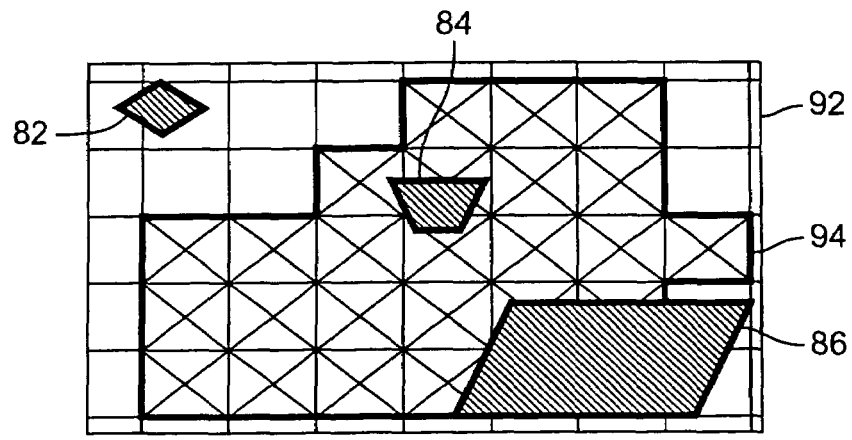

FIG. 12 illustrates a technique for quickly identifying opaque objects that do not intersect any transparent objects without a direct determination of intersection between different pairs of opaque and transparent objects. The technique maps transparent artwork objects 88, 90 to an off-screen low-resolution grid 92 (e.g., 32×32 cells). As used herein, the term grid 92 does not imply a particular geometry of grid cells. That is, the grid 92 is merely a planar subdivision that can feature cells of a variety of geometries (e.g., squares, triangles, hexagons, and so forth). The portion of the grid 92 that includes any part of a transparent object is marked. In one implementation, this is performed by setting a rasterization engine's transform matrix to map bounding boxes of transparent objects to the low-resolution grid. As shown in FIG. 13, this marking produces a coarse approximation 94 of regions including transparent objects. Mapping an opaque object 82, 84, 86 to the low-resolution grid 92 quickly provides an estimate of whether any particular opaque object 82, 84, 86 overlaps any transparent objects. Because of the coarseness of the approximation of the transparent region 94, this approach will sometimes miscategorize an opaque object as overlapping the transparent region when no such overlap exists. However, the technique quickly identifies objects that do overlap the transparent region.

This technique can be implemented using fast rasterization engine functions. For example, after painting the low-resolution grid (e.g., raster) white, the initial mapping of transparent objects to the low-resolution grid may be done by painting the transparent objects on the grid in black, for example, using an over-scanning flood-fill mode. The testing of whether an opaque object overlaps the transparency region may be performed using a rasterization engine blending mode function that checks a cell in the low-resolution grid and determines whether or not it has been previously painted black.

Figure 15:
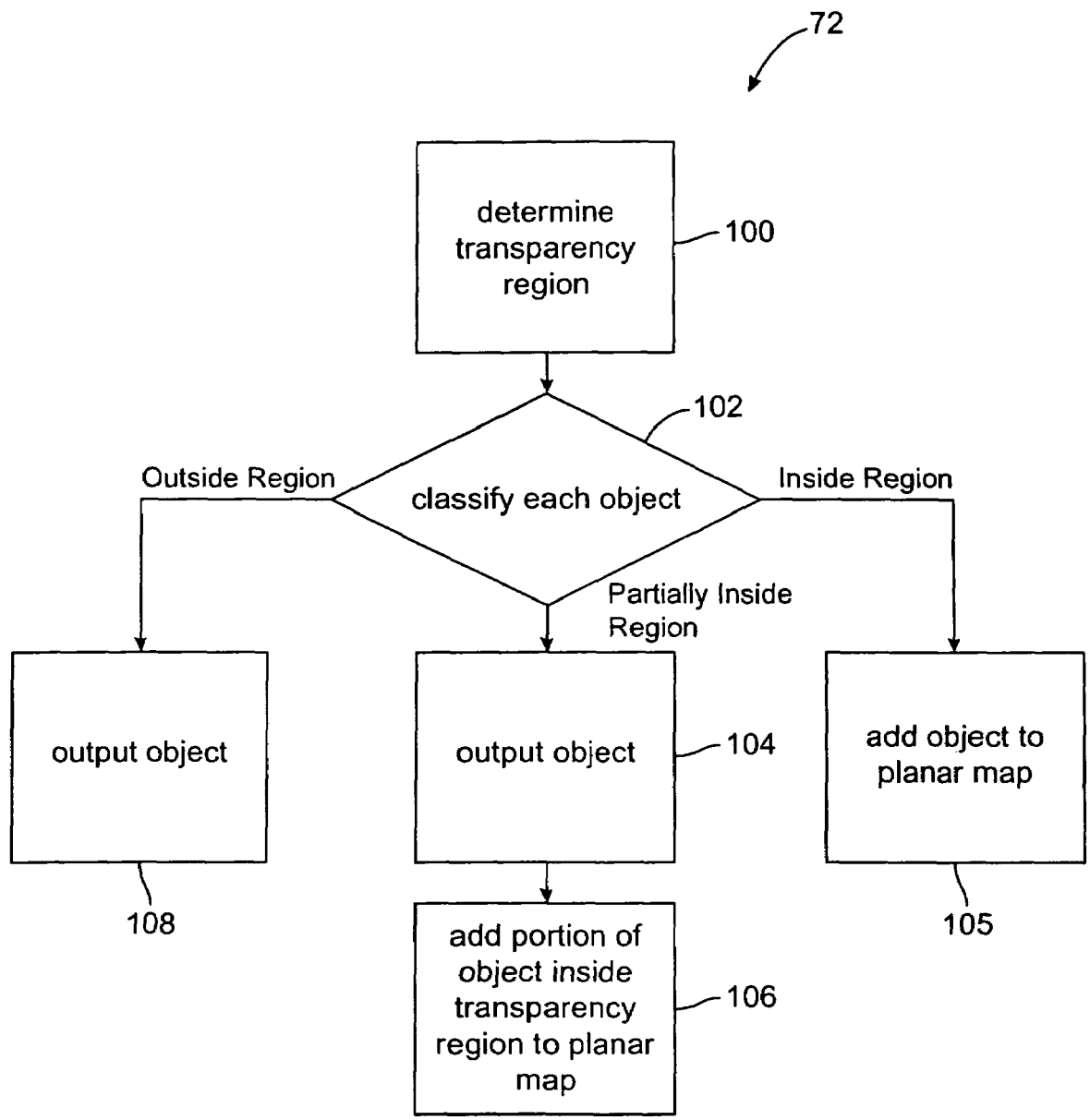
FIG. 15 is a flowchart of a process for excluding regions of an illustration from representation in a planar map.

These techniques may be incorporated into a process that avoids adding opaque objects that do not overlap transparent objects to the planar map. FIG. 15 shows one such process 72. After determining the transparency region 100, for example, by drawing the transparent objects on a low-resolution grid, the process 72 classifies 102 each opaque object based on its intersection, if any, with the transparency region. An opaque object may be completely inside the transparency region, partially inside, or completely outside the transparency region. Classifying an opaque object as being completely inside or completely outside requires analysis of the entire area covered by the opaque object. However, an opaque object can be immediately classified as being partially inside the transparency region once analysis of the region occupied by the opaque object yields at least one portion inside and one portion outside.

If the opaque object is completely outside the transparency region, the process 72 immediately outputs 108 the opaque object to the output stream without adding the artwork object to the planar map. If the opaque object is completely inside the transparency region, the process 105 adds the entire object to the planar map. If, however, the opaque object is partially inside and partially outside the transparency region, the process 72 can immediately send 104 the opaque object to the output stream and add 106 the opaque object to the planar map. Alternatively, the process can add only the portion of opaque object that is inside the transparency region to the planar map. In either case, portions of an illustration that do not require transparency processing to determine their appearance do not unnecessarily consume computer resources.

Figure 16:
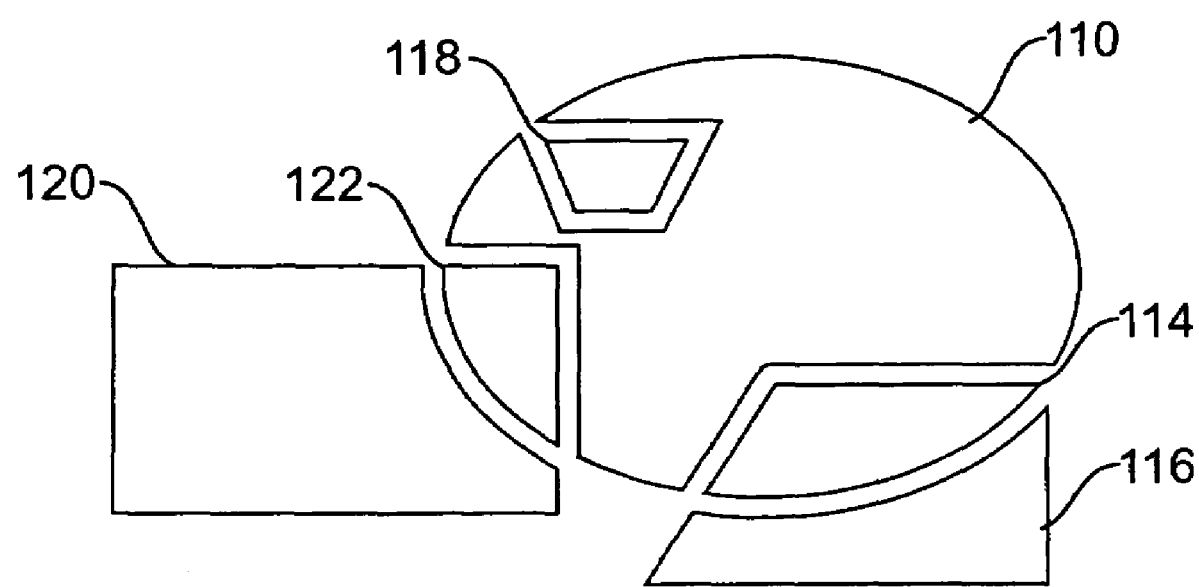
FIG. 16 is a diagram of a planar map.

FIG. 16 shows a planar map produced using the process 72 shown in FIG. 15. The planar map does not include any regions corresponding to opaque object 84, but does include opaque object 86 in its entirety (shown as planar map region 118). The map also includes a portion of opaque object 88 clipped to the transparency region (shown as planar map regions 114 and 116).

The technique of identifying opaque objects that overlap transparent objects may be used to improve a variety of different illustration flattening schemes. For example, opaque objects that do not overlap transparent objects may be added to a flattened raster without compositing each individual dot in the opaque object. Reducing the number of dots composited both speeds processing and reduces consumption of computer resources.

In a variation of the above, a process can exclude artwork objects from flattening based on a determination that the object is obscured by an opaque object. For example, an opaque object may be on an "higher" layer (i.e., conceptually closer to the screen) than objects beneath. Including the obscured artwork objects in a flattening process merely expends resources without altering the appearance of the output. An implementation to exclude obscured artwork from flattening may involve processing artwork objects layer by layer and progressively mapping out regions covered by opaque objects. As a transparent object is encountered in the layer by layer processing, a comparison may be made to determine if the transparent objects is completely (or partially) covered by a region mapped by one or more "higher" opaque objects. The covered portion may be excluded from the flattening process.

The use of a low-resolution off-screen raster to make quick estimations of illustration can be used to perform other functions. For example, an off-screen grid can be used to identify complex regions of an illustration.

B. Identifying Complex Regions of the Illustration

Some illustrations may feature areas having multiple objects in a very small space. These objects typically produce a large number of very small (e.g., pixel or sub-pixel sized) atomic regions. For these small spaces, it can be more efficient to determine the color value of each point individually (i.e., rasterize a small area) than add the very small atomic regions to the planar map. FIGS. 17–20 illustrate a technique for identifying complex regions of an illustration.

Figure 17:
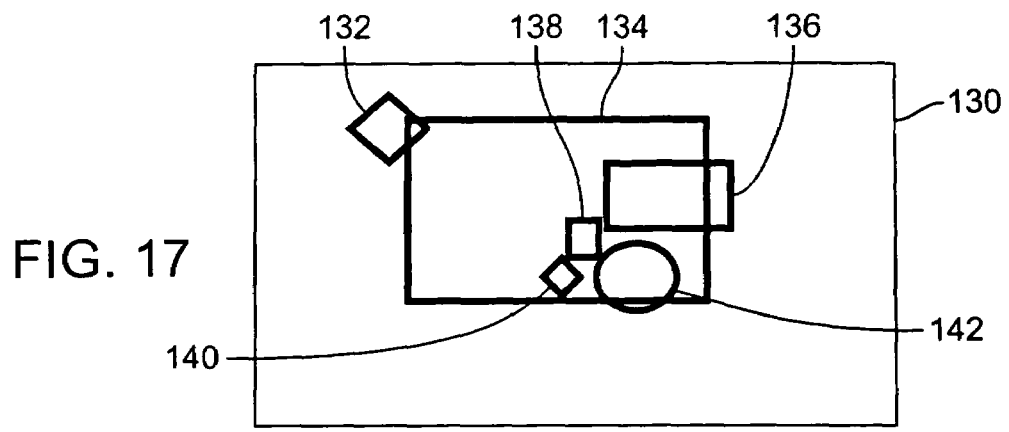
FIGS. 17–20 are diagrams illustrating a process for identifying complex regions of an illustration.
Figure 18:
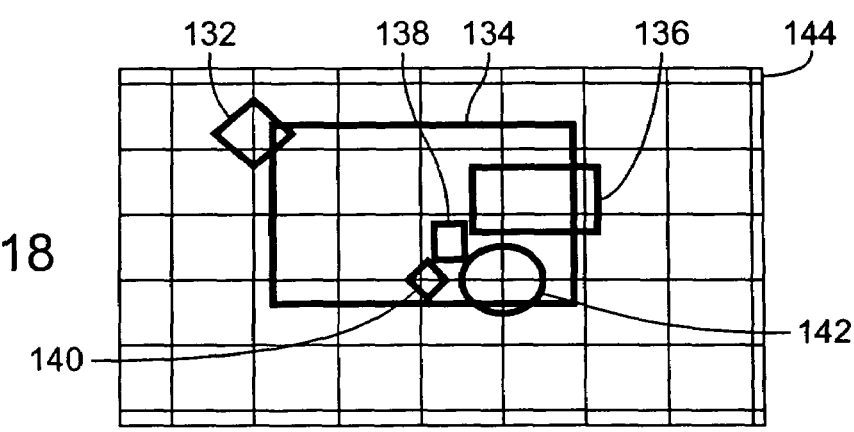
Figure 19:
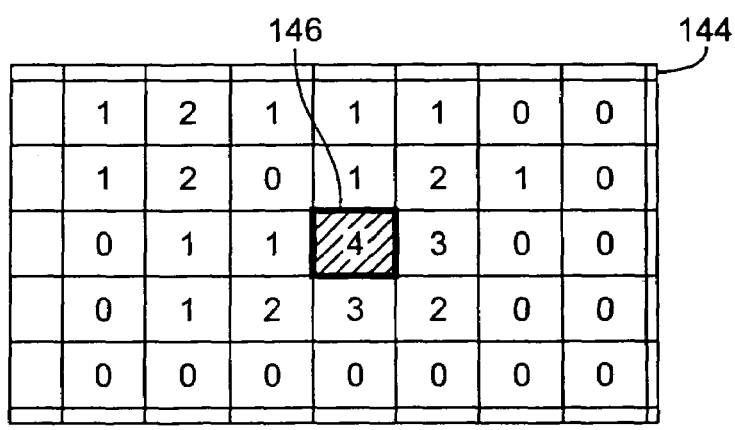
Figure 20:
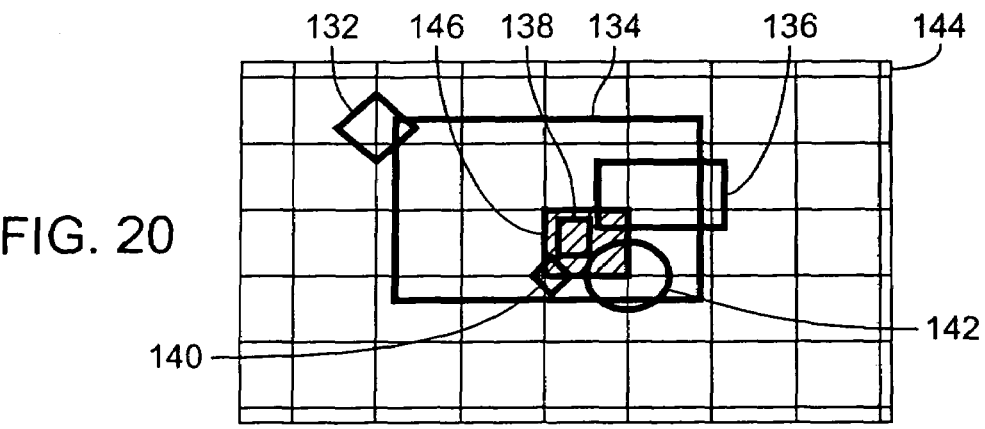

FIG. 17 shows an illustration 130 of artwork objects 132–142. As shown, many of the objects 132–142 appear clustered near object 138. FIG. 18 shows a mapping of the artwork objects onto an off-screen low-resolution grid 144. The resolution of the grid 144 may be fixed or dynamically determined. Counting the number of objects having an outline in each grid cell can identify complex regions. FIG. 19 shows a count of objects whose paths enter each cell in the low-resolution grid. As shown, grid cell 146 is entered by objects 136–142 and has a value of "4". A threshold can identify those grid cells having highly complex geometry. For example, a user may define any cell having a value of "4" or more as being highly complex. Based on this threshold, a grid cell may be classified as a complex region and rasterized instead of adding objects in the cell into the planar map (as illustrated in FIG. 20). Alternatively, the process may use different techniques to produce a threshold (e.g., set the threshold so that it includes the most complex 5% of grid cells).

Figure 21:
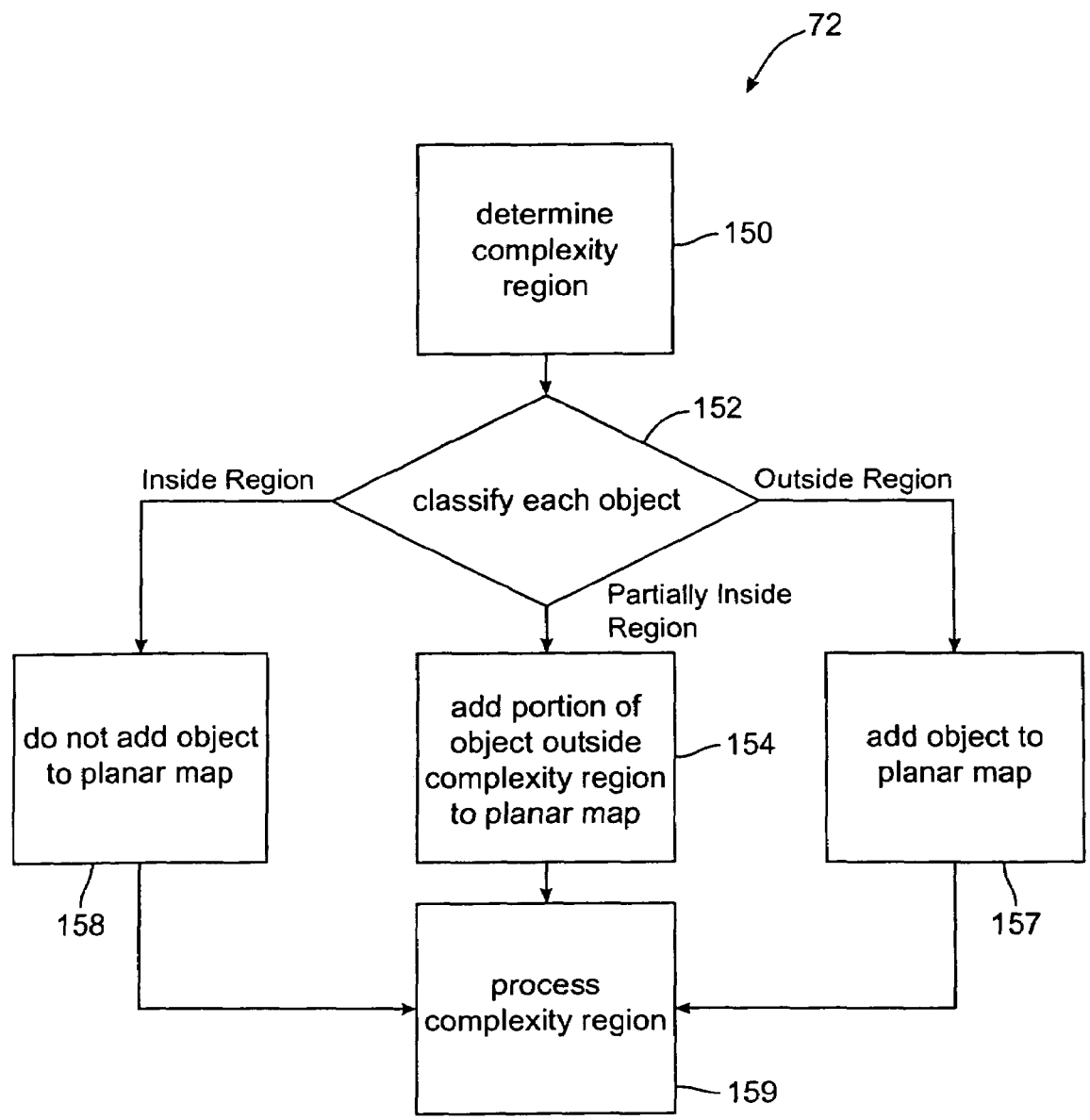
FIG. 21 is a flowchart of a process for excluding regions of an illustration from representation in a planar map.

FIG. 21 shows a process 72 for identifying complex regions of an illustration and processing objects that lie in the complex regions without use of the planar map. After identifying complex regions of an illustration 150, each object can be classified as being completely inside the complex region, partially inside, or completely outside the area. If completely inside, the object is not added 158 to the planar map. If completely outside, the object is added 157 to the planar map. If only partially inside, the entire object may be added to the planar map or, alternatively, only the portion of the object lying outside the complex region may be added to the planar map. The complex regions are then processed 159 (e.g., rasterized) for display independent of the processing for planar map regions.

The process readily lends itself to the use of rasterization engine functions. For example, to determine high complex regions, each artwork object may be drawn in the low-resolution grid using a pen having a thickness of "1" and a transparency alpha value near "0". Thus, stroking each object adds a value of "1" to each cell covered by the stroke and darkens the cell. An intersection blending mode can identify "dark" cells having a number of strokes that exceeds the user defined threshold.

Figure 22:
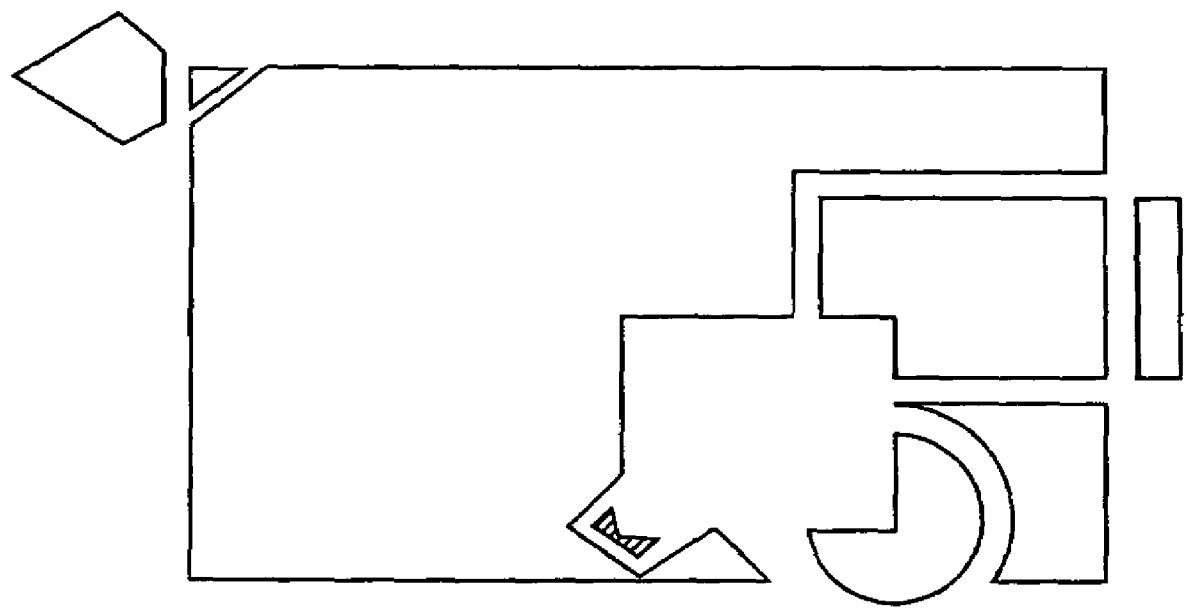
FIG. 22 is a diagram of a planar map.

FIG. 22 shows a planar map produced by the process of FIG. 19. As shown, object 138 is not represented in the planar map. Additionally, only portions of objects 136, 140, and 142 outside the complex regions appear in the planar map.

Again, this technique for quickly identifying complex regions of an illustration may be used in systems that use flattening techniques other than the planar map technique described above, for example, to reduce the number of object intersections that need to be handled by other flattening techniques.

Embodiments

Figure 23:
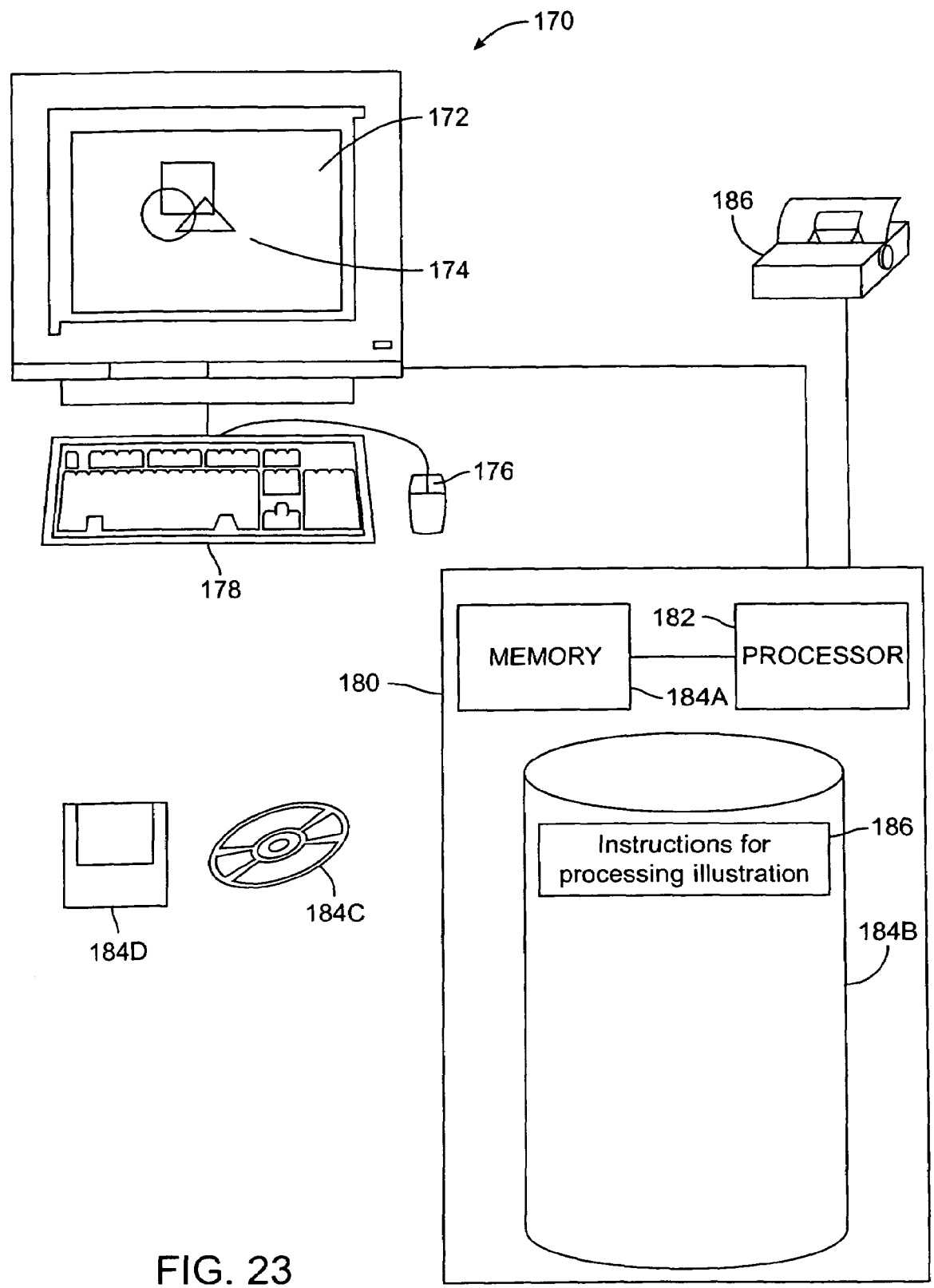
FIG. 23 is a diagram of a computer platform.

FIG. 23 shows a computer platform 170 suitable for implementing the techniques described above. The platform 170 can include an output device such as a monitor 172 or printer 186 for displaying an illustration 174. The platform may also include a keyboard 178 and/or pointing device 176. The platform includes a digital computer 180 that further includes a processor 182 and access a computer readable medium (e.g., Random Access Memory 184A, hard disk 184B, CD-ROM 184C, and/or floppy disk 184D). The memory can include instructions 186 that implement the techniques described herein. These instructions 186 are transferred to the processor 182 for execution in the course of operation.

However, the techniques described here are not limited to any particular hardware, firmware, or software configuration; they may find applicability in any computing or processing environment. Additionally, different embodiments can be used in different graphics environments. For example, the disclosed invention can be used in a resolution-independent graphics environment that specifies artwork positioning using vectors and generates artwork coordinates when associated with a particular resolution.

The techniques may be implemented in hardware or software, or a combination of any of them. Preferably, the techniques are implemented in computer programs executing on programmable computers that each include a processor, a storage medium readable by the processor (including volatile and non-volatile memory and/or storage elements), at least one input device, and one or more output devices. Program code is applied to data entered using the input device to perform the functions described and to generate output information. The output information is applied to one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferable stored on a storage medium or device (e.g., CD-ROM, hard disk or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Though elements of the following claims are listed one after another, the ordering of these elements does not imply a particular ordering of operations. Additionally, many of the operations may be performed incrementally.

Other embodiments are within the scope of the following claims.

What is claimed is:

1. A computer-implemented method of graphics processing, the method comprising:
   stroking artwork objects of a computer graphics illustration onto a grid of cells;
   identifying a cell as a complex region based on a darkness of the cell after the stroking; and
   identifying one or more of the artwork objects of the illustration to include in an illustration flattening process based on the identification of the complex region.

2. The method of claim 1 wherein the illustration flattening process comprises a process for producing a planar map of the illustration.

3. The method of claim 1 wherein identifying artwork objects to include in an illustration flattening process comprises excluding artwork objects classified as being entirely inside the complex region.

4. The method of claim 1 wherein stroking an artwork object comprises using a rasterization engine function to stroke the artwork object onto the grid of cells using a pen having a thickness "1" and a transparency alpha value near "0". whereby stroking the artwork object adds a value of "1" to each cell covered by the stroke and darkens the cell.

5. The method of claim 1 wherein identifying the cell as complex comprises comparing the darkness of the cell with a threshold.

6. The method of claim 5 wherein the threshold comprises one of a threshold based on user input or a dynamically determined threshold.

7. The method of claim 1 wherein the illustration has a first associated resolution and the grid has a second resolution, the second resolution being less than the first resolution.

8. The method of claim 1 further comprising classifying at least one of the artwork objects of the illustration based on the intersection of an outline of the artwork object with the complex region.

9. The method of claim 8 wherein classifying comprises one of identifying the artwork object as having an outline that is completely inside the complex region, identifying the artwork object as having an outline that is outside the complex region, or identifying the artwork object as having an outline that is partially inside the complex region.

10. A computer program product, tangibly stored on (machine) computer readable medium, for computer graphics processing, the product comprising instructions operable to cause a processor to:
    stroke artwork objects of a computer graphics illustration onto a grid of cells;
    identify a cell as a complex region based on a darkness of the cell after stroking and
    exclude, based on the identifying of the cell as a complex region, one or more artwork objects from an illustration flattening process.

11. The product of claim 10, wherein instructions to exclude comprise instructions to:
    exclude an artwork object that is entirely inside the complex region.

12. The product of claim 10, wherein:
    the illustration flattening process includes a process for producing a planar map of the illustration.

13. The product of claim 10, wherein the instructions to identify a cell as a complex region includes instructions to:
    compare, with a threshold, the darkness of the cell.

14. The product of claim 13, wherein the instructions to compare includes instructions to:
    dynamically determine the threshold.

15. The product of claim 13 wherein the instructions to compare the darkness of the cell with a threshold includes instructions to:
    determine the threshold based on user input.

16. The product of claim 10, wherein the instructions to stroke includes instructions to:
    stroke the artwork object onto the grid of cells using a pen having a thickness of "1" and a transparency alpha value near "0", whereby stroking the artwork object adds a value "1" to each cell covered by the stroke and darkens the cell using a rasterization engine.

17. The product of claim 10, further comprising instructions to:
    classify an artwork object based on an intersection of an outline of the artwork object with the complex region.

18. The product of claim 17, wherein instructions to classify an artwork object work includes instructions to:
    determine one of whether the outline of the artwork object is completely inside the complex region, whether the outline of the artwork object is completely outside the complex region, or whether the outline of the artwork object is partially inside the complex region.

19. The product of claim 10, wherein:
    the illustration has a first associated resolution and the grid has a second resolution, the second resolution being less than the first resolution.

* * * * *